June 30, 1959 R. T. JAMES ET AL 2,892,888

DIGITAL SYSTEM WITH ERROR ELIMINATION

Filed Feb. 10, 1958 8 Sheets-Sheet 1

INVENTORS R. T. JAMES
A. E. RUPPEL

BY Alan C. Rose

ATTORNEY

INVENTORS R.T. JAMES
A.E. RUPPEL
BY Alan C. Rose
ATTORNEY

INVENTORS R. T. JAMES
A. E. RUPPEL

BY Alan C. Rose

ATTORNEY

DIGITAL SYSTEM WITH ERROR ELIMINATION

INVENTORS R. T. JAMES
A. E. RUPPEL
BY Alan C. Rose
ATTORNEY

INVENTORS R. T. JAMES
A. E. RUPPEL
BY Alan C. Rose
ATTORNEY

INVENTORS R. T. JAMES
A. E. RUPPEL
BY Alan C. Rose
ATTORNEY

DIGITAL SYSTEM WITH ERROR ELIMINATION

Filed Feb. 10, 1958

INVENTORS R. T. JAMES
A. E. RUPPEL

BY Alan C. Rose

ATTORNEY

June 30, 1959 R. T. JAMES ET AL 2,892,888

DIGITAL SYSTEM WITH ERROR ELIMINATION

Filed Feb. 10, 1958 8 Sheets-Sheet 8

INVENTORS R. T. JAMES
A. E. RUPPEL

BY Alan C. Rose

ATTORNEY

United States Patent Office 2,892,888
Patented June 30, 1959

2,892,888

DIGITAL SYSTEM WITH ERROR ELIMINATION

Richard T. James, Central Valley, and Alfred E. Ruppel, East Rockaway, N.Y.; said James assignor to American Telephone and Telegraph Company, a corporation of New York; said Ruppel assignor to Bell Telephone Laboratories, Incorporated, New York, N.Y., a corporation of New York Application February 10, 1958, Serial No. 714,300

13 Claims. (Cl. 178—23)

This invention relates to digital data processing apparatus and more specifically to error detection and correction systems.

In the transmission of digital information from a source to a utilization circuit, the connecting data link is frequently subject to transmission impairments. Many schemes have been proposed previously for detecting or correcting errors which are introduced into the transmitted digital information. The simplest form of error detection could involve the transmission of each digit twice. Errors could be detected by the difference in successive transmitted digits. Similarly, digital information could be corrected on a two-out-of-three basis by the transmission of each digit of a message three times. More sophisticated error detection and correction systems which require much less redundancy have also been proposed. An example of such a system is disclosed in R. W. Hamming et al., Re. Patent 23,601, granted December 23, 1952. In the system disclosed in this patent, parity checks over various groups of information digits are performed, and parity check digits resulting from this operation are added to the original information digits. A parity check digit is a digit which is added to a code group to make the sum of the digits in the code group either odd or even, depending on the type of parity check which is being employed. Thus, for example, if an odd parity check were performed on the code group 101101, the parity check bit would be a "1" to make the total number of "1's" odd. By forming parity checks over different groups of information digits, sufficient additional check information may be provided to permit correction of the received message. As the error correction capabilities of the codes are increased, however, the redundancy of the transmitted message is correspondingly increased, and the rate of transmission of signals is therefore substantially reduced.

Accordingly, one object of the present invention is to improve error detection and correction systems.

In accordance with the present invention, noise hits on data links are detected and converted into digital signals. The resultant noise indication constitutes an error check signal which is then combined with conventional digital error check signals, and the transmitted digital information is corrected in accordance with the combined check signals. For example, if the same information is transmitted along two separate transmission facilities, the received messages may be compared on a bit-by-bit basis and the noise hits on each facility may be detected. If the bit-by-bit comparison circuit indicates an error and the noise detection circuit shows that one of the facilities was hit by a burst of noise, switching circuits may be operated to select the unaffected facility. Accordingly, the message is transmitted in its correct form over the unaffected facility to the utilization circuit associated with the receiver.

In accordance with an important feature of the invention, a source of digital information signals and a utilization circuit are intercoupled by a digital encoder, at least one data link, and a decoder. The encoder and decoder include circuitry for transmitting the digital information signals with increased redundancy to permit error detection, noise hits on the data link are detected and quantized to provide additional error detection signals, and errors in the received information signals are eliminated through the use of both types of digital error detection information.

In accordance with another feature of the invention, digital signals are transmitted over two separate facilities and are compared on a bit-by-bit basis, circuits for detecting noise on each of the two facilities are provided, and switching circuits are energized in the event of error indications by the bit-by-bit comparator to select the channel which is unaffected by noise hits.

In accordance with a further feature of the invention, transmitted digital signals are provided with additional parity check signals for error detection, and an additional circuit is provided for detecting and quantizing noise signals. In the event of a parity check failure, the digital noise signals are employed to identify the erroneous digital signals and permit their elimination.

In accordance with an additional feature of the invention, check output signals from the bit-by-bit comparison circuitry, the parity checking circuitry, and the noise detection arrangements described in the foregoing two paragraphs may be combined to produce a system having powerful error correction characteristics.

One advantage of the present error correction circuitry as contrasted with the conventional error correction circuits which merely employ a large amount of redundant information is the reduction in the amount of digital signals which must be transmitted. This is possible as a result of the digital check information derived from the noise hits. A larger proportion of signal information may therefore be transmitted over transmission facilities for any given level of error correction for the overall system.

A complete understanding of this invention and of these and various other features thereof may be gained from consideration of the following detailed description and the accompanying drawing, in which.

Figure 1:
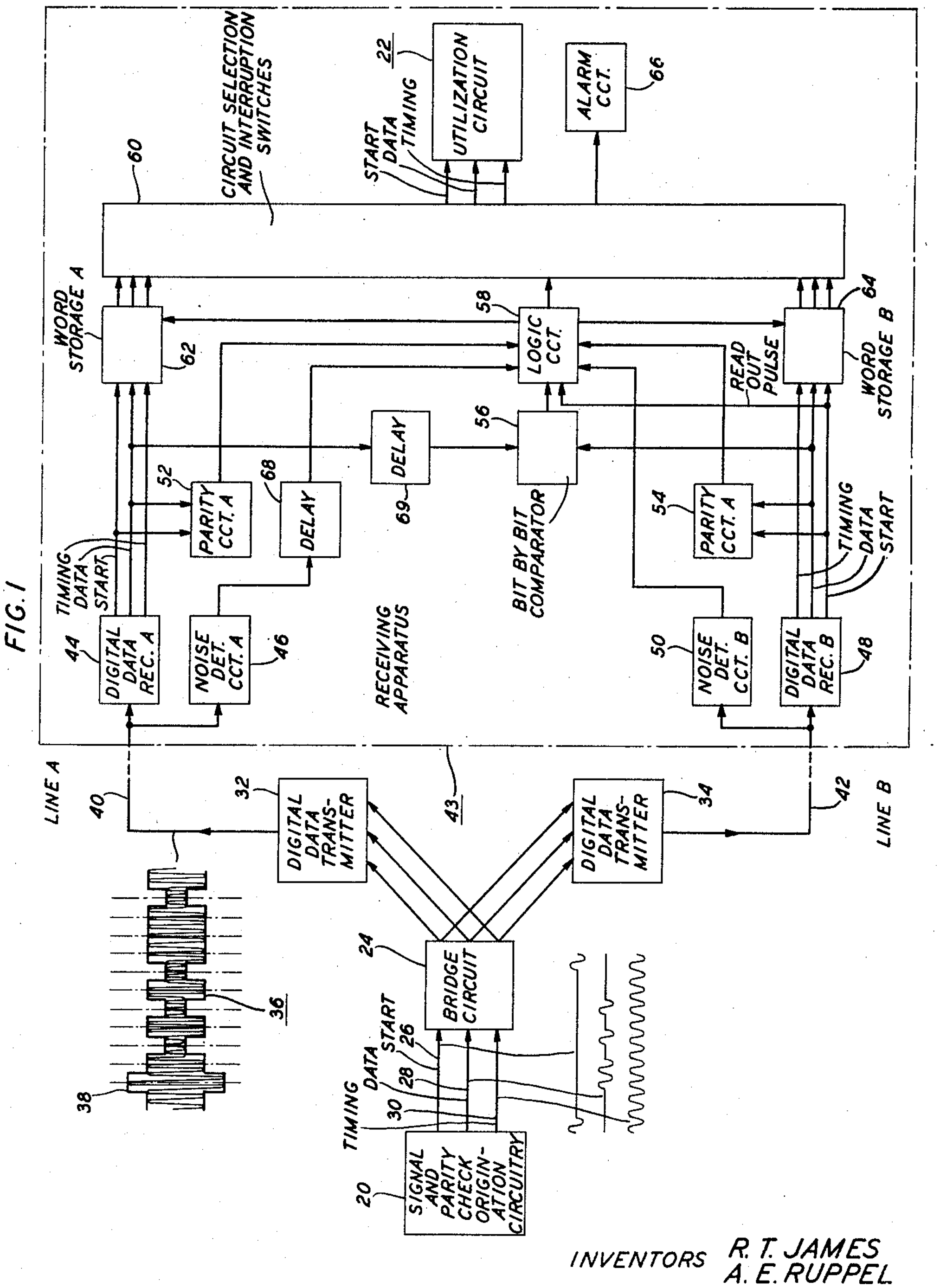
Fig. 1 is a block diagram of a digital data handling system with provision for error elimination in accordance with the present invention.
Figure 4:
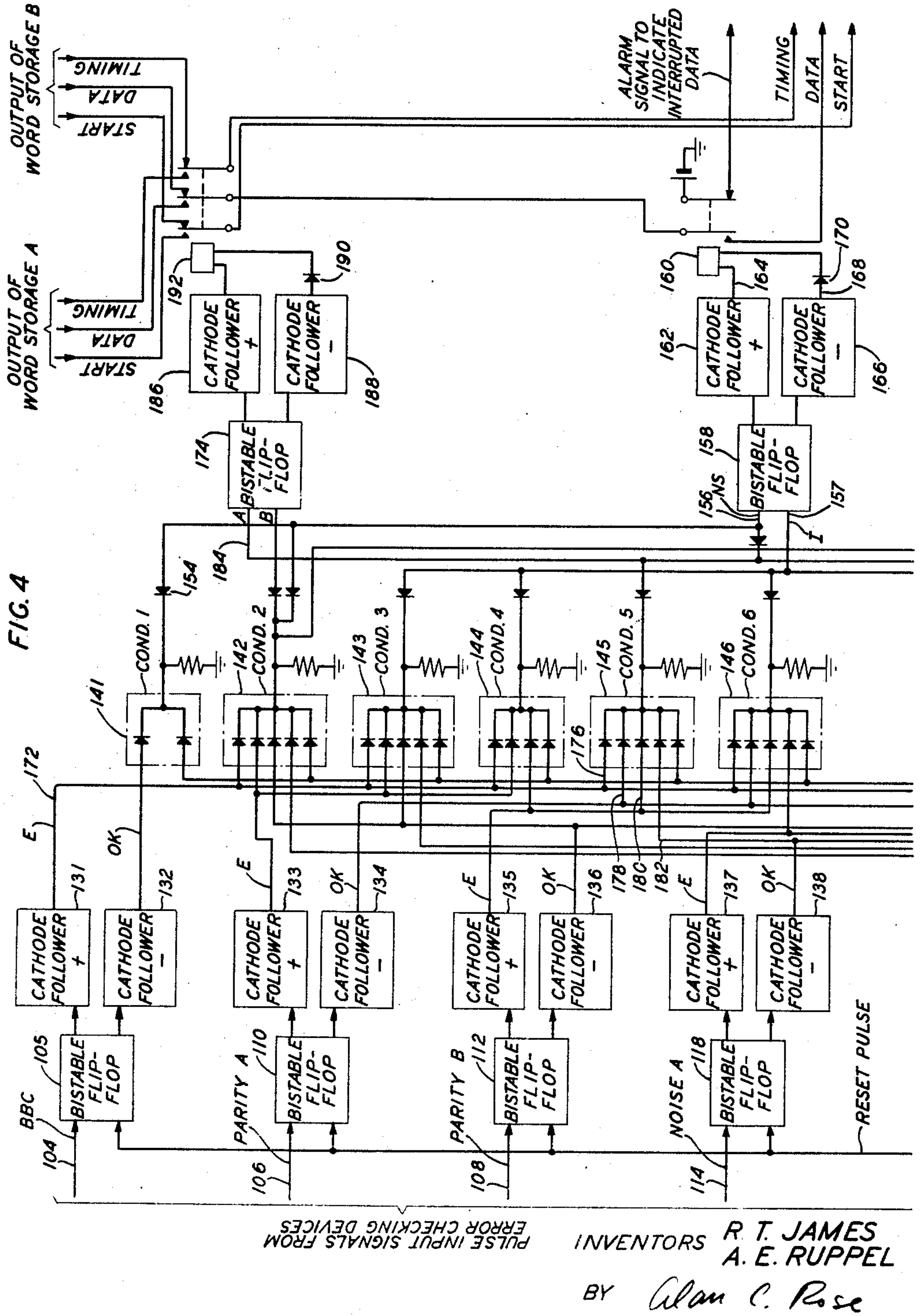
Figure 5:
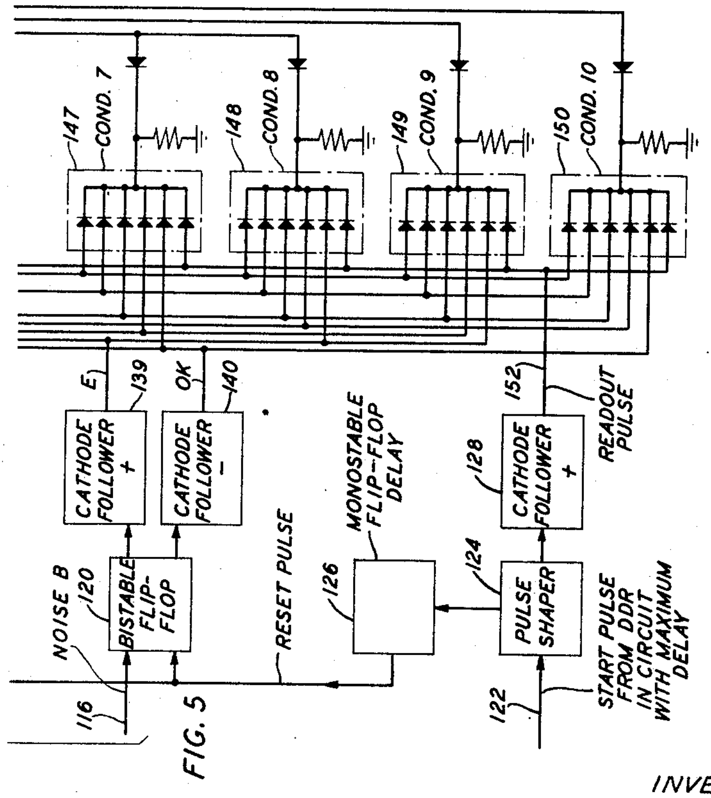
Figure 10:
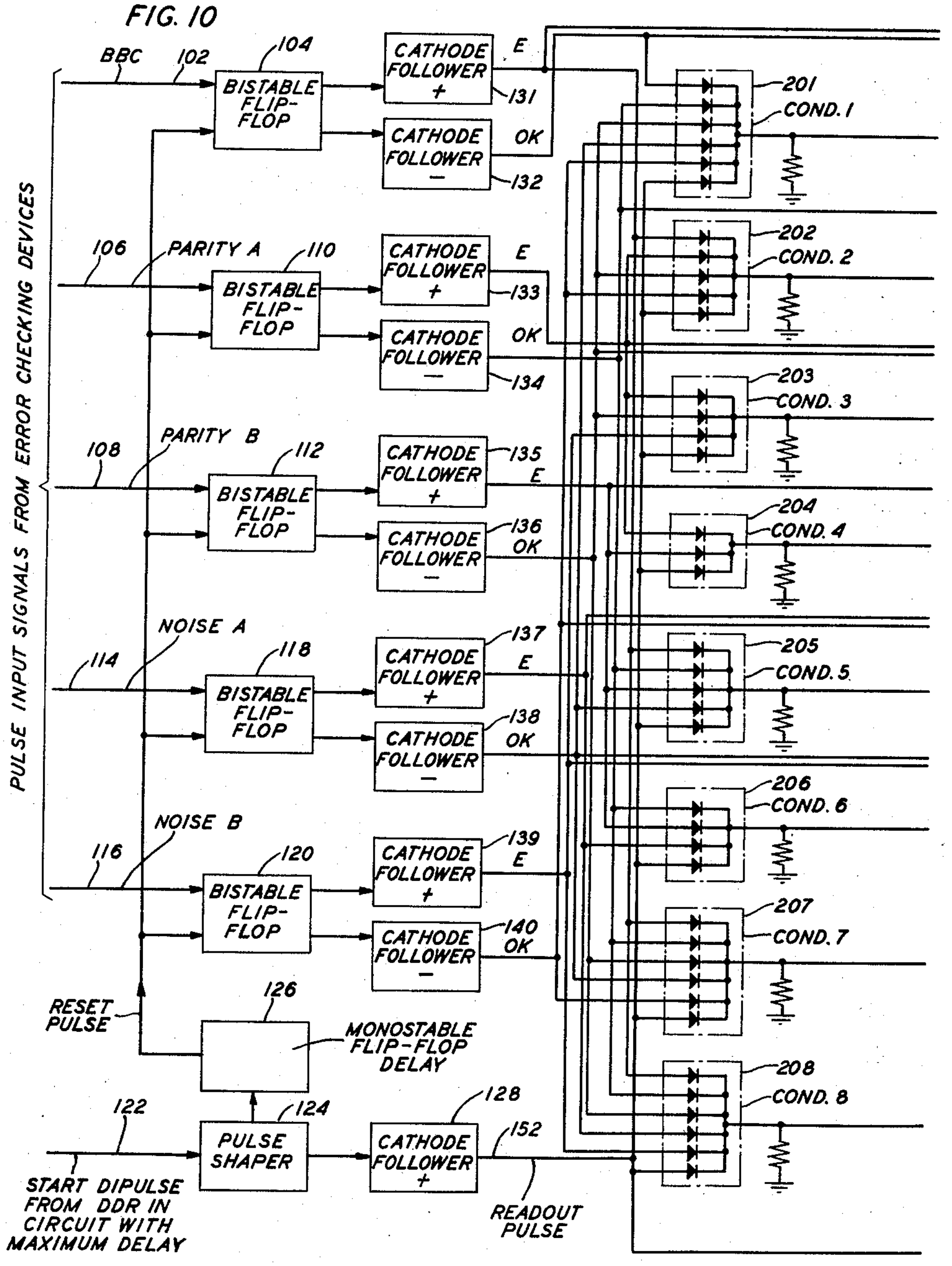
Figure 11:
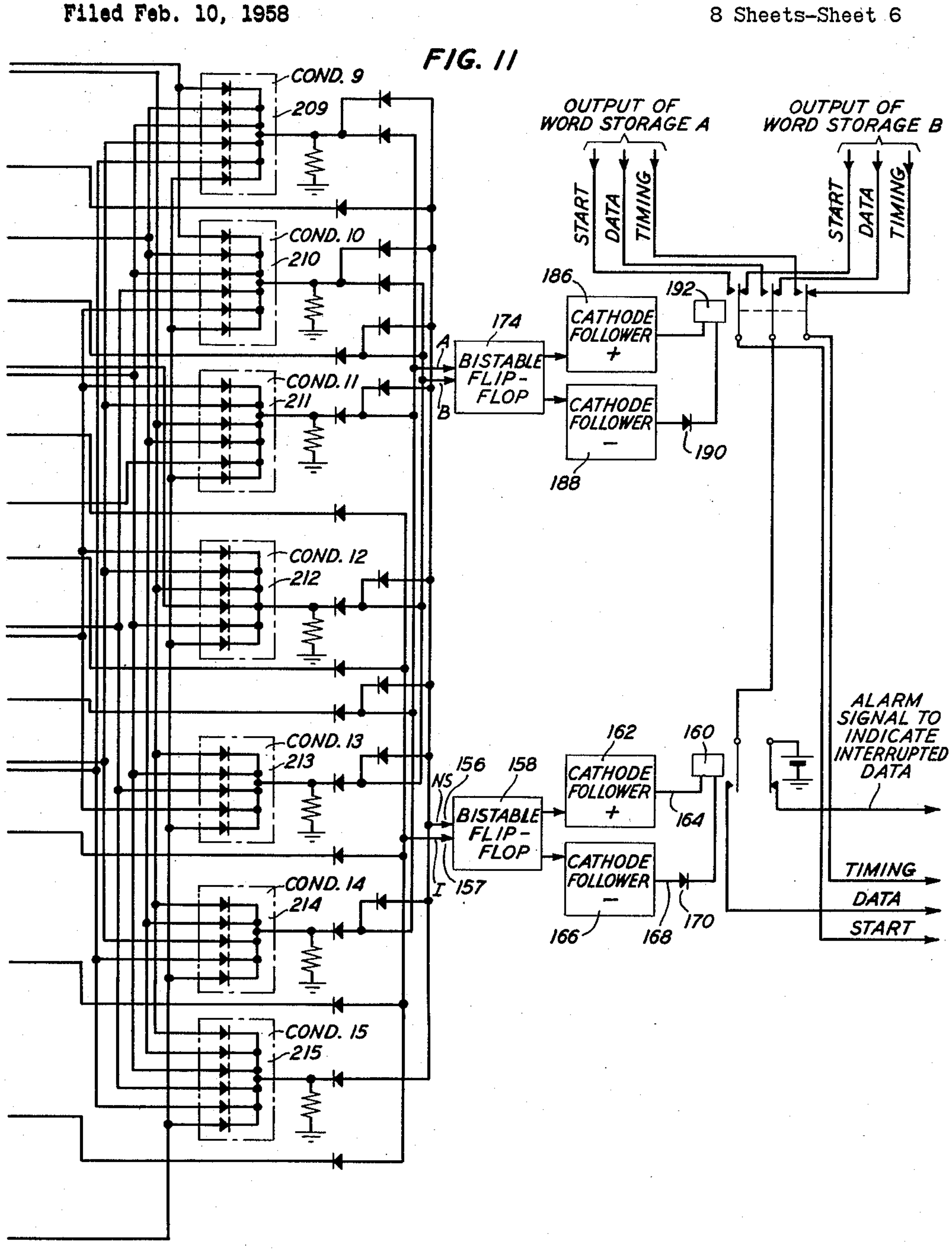
Figure 12:
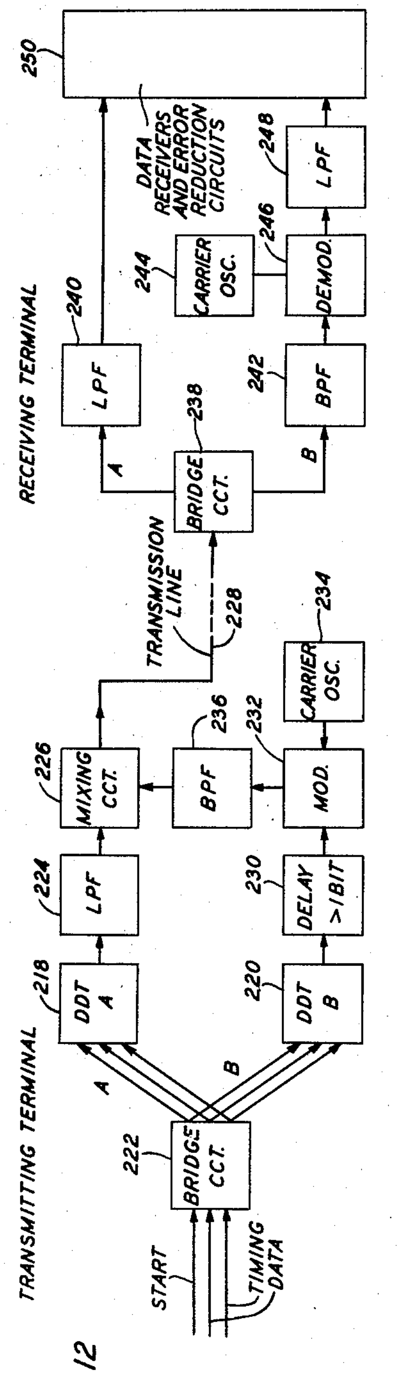
Figure 13:
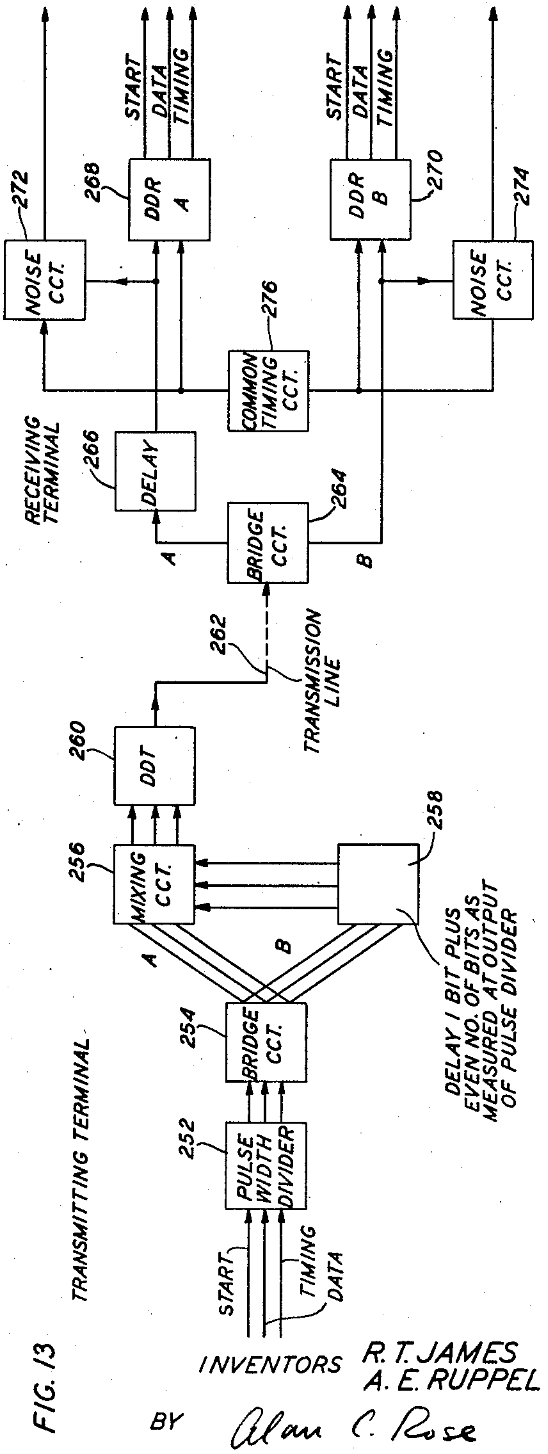
Figure 14:
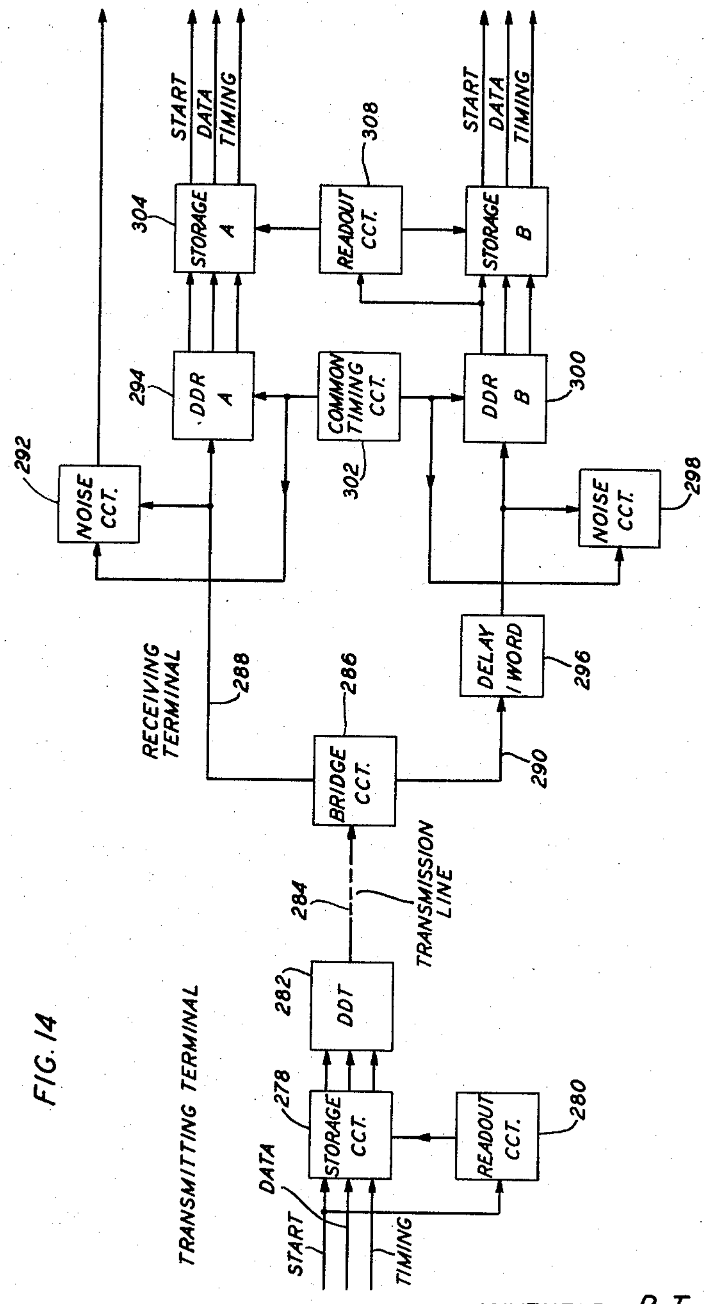

Figs. 4 and 5 together constitute a logic circuit diagram in accordance with the invention which may be utilized in the circuit of Fig. 1;

Figs. 6, 7, 8, and 9 are circuit diagrams of component circuits which are employed in the more complex circuit diagrams of the present application;

Figs. 10 and 11 together constitute an alternative logic circuit diagram in accordance with the invention which may be included in the circuit of Fig. 1;

Fig. 12 shows a frequency division multiplexing error correction arrangement in accordance with the present invention; and Figs. 13 and 14 are time division multiplexing error correction circuits in accordance with the present invention.

Referring more specifically to the drawing, Fig. 1 is a block circuit diagram of an illustrative embodiment of the invention. In Fig. 1, it is desired to transmit digital signals from the signal origination circuitry 20 to the utilization circuit 22. The transmitted signals are to be in digital form, and will include successive groups, or "words," each including a standard number of binary digits, or "bits." As developed in the signal origination circuitry 20, the start signal is in the form of a dipulse, which is a single cycle of a sine wave. Timing signals are provided by a standard sine wave signal source. Binary signals from the origination circuitry 20 are in the form of the presence or absence of dipulse signals in successive digit periods, as defined by successive cycles of the timing signal. In addition, a parity check signal is included in each word of digital information provided by circuit 20.

The start, data, and timing signals are coupled to the bridge circuit 24 on leads 26, 28, and 30, respectively. From the bridge circuit 24, the three signals are coupled to both of the digital data transmitters 32 and 34. At the output of each of the digital data transmitters 32 and 34, the signals have the form indicated at 36. The wave form 36 is an amplitude modulated signal which includes start pulse indications and additional signals. The start pulses designated 38 mark the beginning of successive words and have an amplitude which is greater than the digital signals included in each word. The space between successive start pulses is divided into time slots, or digit periods, as indicated by the equally spaced vertical dash-dot lines in the wave form 36. The digital signals are represented by the magnitude of the alternating current carrier signal in successive time slots. Thus, a binary "1" is represented by a signal having a relatively large magnitude, whereas a binary "0" is represented by a low amplitude signal in a given time slot. The frequency of the carrier signal of the wave form 36 may, for example, be approximately 2,000 cycles. The digital data transmitters 32 and 34 include the conventional modulation circuitry required for transforming the signals on leads 26, 28, and 30 into the form shown at 36.

In the system shown in Fig. 1, it is important that one error-free channel be available for signal transmission from the signal origination circuitry 20 to the utilization circuit 22. Accordingly, two alternative channels 40 and 42 are provided. These channels are preferably provided over geographically separated facilities, so that the likelihood of both channels being out at the same time is reduced.

At the receiving terminal or apparatus 43 shown at the right-hand side of Fig. 1, the signals derived from one of channels 40 or 42 are decoded and applied to the utilization circuit 22. The receiving terminal 43 includes the digital data receiver 44 and the noise circuit 46 coupled to channel 40. In the digital data receiver 44, start, data, and timing signals, such as those shown associated with leads 26, 28, and 30, are recovered. Similar digital data receiver and noise circuits 48 and 50 are associated with channel 42 at the receiving terminal.

It may be noted that channel 40 is also designated line A, and that channel 42 is also designated line B. Similarly, the various circuits in the receiving terminal associated with lines A and B are identified by the appropriate letter. In addition to signals registered by the noise detection circuits 46 and 50, other check information is obtained by the parity check circuits 52 and 54 associated with channels A and B, respectively. The correctness of the digital signals received on lines A and B is also checked by the bit-by-bit comparison circuit 56. The three types of checking information are applied to the logic circuit 58. In the logic circuit 58, the various check signals are combined systematically to indicate the probability that the signal on either line A or line B is correct. Output signals from the logic circuit 58 are thereafter applied to the circuit selection and interruption switching circuitry 60.

One word of received data from lines A and B is stored in each of the word storage circuits 62 and 64. These storage circuits may, for example, be suitable shift register circuits having one stage for each bit of the received signal. Following the selection of channel A or B as bearing the correct signal information during a given word period, the signals stored in either word storage circuit 62 or word storage circuit 64 are transmitted through to the utilization circuit 22. It must be mentioned, however, that if the logic circuit 58 indicates that the received information on both channels is probably erroneous, an interruption switch included in the circuit 60 is energized, and no information is transmitted to the utilization circuit 22. Under these circumstances, a signal is also applied to the alarm circuit 66 to indicate that some data has been deleted. The alarm circuit 66 may, for example, include a counter circuit to register the number of deleted words over a given period of time.

Normally, there will be a difference in the delay of the channels 40 and 42 which produces a staggered time of arrival of signals at the digital data receivers 44 and 48. This time differential is accommodated in various ways, as will be described in detail below. For example, the delay circuit 68 is required between the noise detection circuit 46 and the logic circuit 58 to insure simultaneous arrival of the signal from noise circuit 46 with check information from other sources. Similarly, the delay circuit 69 is required to equalize the delay from the two data leads to the respective inputs of the bit-by-bit comparator 56.

Figure 2:
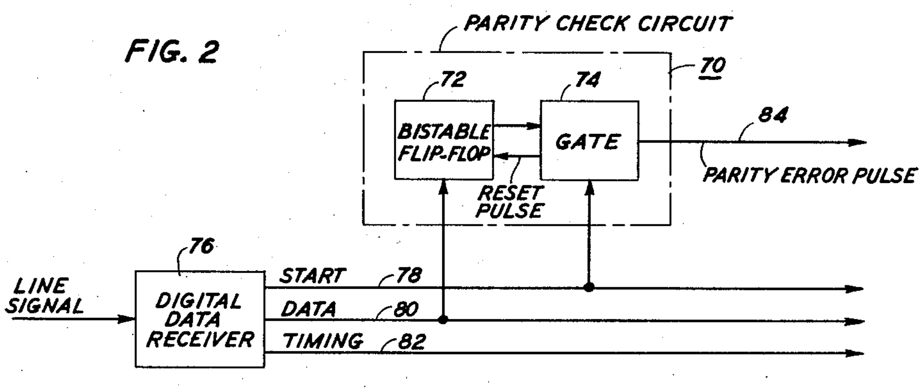
Fig. 2 is a block diagram of a parity check circuit associated with a digital data receiver.

Fig. 2 is a circuit diagram which shows the coupling of the parity check circuit to the output signals from the digital data receivers. In Fig. 2, the parity check circuit 70 includes the bistable flip-flop 72 and the gate 74. The signals from the digital data receiver 76 include the start signal on lead 78, the data and parity check bit signals on lead 80, and the timing signal on lead 82. The bistable flip-flop 72 is provided with steering circuits to form a single stage of a counter circuit. Thus, successive data signals on lead 80 set the flip-flop 72 to opposite states. Although either even or odd parity signals could be used, in the present circuits an even parity check is employed. That is, an even parity check pulse is provided at the end of each word to make the total number of bits included in each word even. A parity error pulse is produced on lead 84 at the output of gate 74 if the bistable flip-flop 72 indicates an odd number of bits included in a single word. The start pulse of the next successive word applies a signal to the gate circuit 74, and resets the bistable flip-flop 72 to its initial state. If it is already in the initial state, no output signal is transmitted on lead 84. However, if it must be reset to the initial state, the transition pulse is applied through gate 74, which has been opened by the start signal, to the output lead 84.

Figure 3:
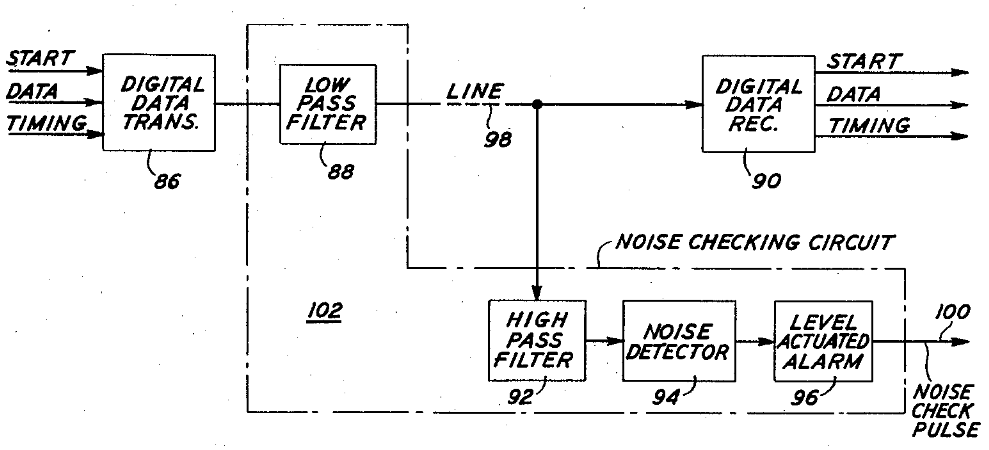
Fig. 3 is a block circuit diagram of a noise detection circuit which may be associated with the interconnecting data link of the system of Fig. 1.

Fig. 3 illustrates the arrangements for the noise detection circuitry. Shown in Fig. 3 are the digital data transmitter 86, the low pass filter 88 associated with the transmitter, and various circuits associated with the receiver terminal including the digital data receiver 90, the high pass filter 92, the noise detector 94, and the level actuated alarm circuit 96. The noise detector 94 is arranged to detect impulses outside the signaling band of the circuit. In the illustrative arrangement shown in Fig. 3, the noise detector is arranged to pick up signals above the normal data signal transmission band. Accordingly, the cut-off frequency of the low pass filter 88 is slightly above the signaling band, and the cut-off frequency of the high pass filter 92 is identical with that of the low pass filter 88. Noise in the signaling band therefore does not reach the noise detector 94. When a noise burst including substantial high frequency components hits the line 98 interconnecting the low pass filter 88 and the digital data receiver 90, the noise pulse is transmitted through the high pass filter 92 to the noise detector 94. If the detected noise is above a predetermined threshold level, the noise alarm or noise signaling circuit 96 is energized, and a noise check pulse is produced on output lead 100. For the purposes of the block diagram circuit of Fig. 1, the noise detection circuits 46 and 50 include all of the circuits shown within the dash-dot block 102 of Fig. 3.

As discussed above, the circuit of Fig. 1 provides various signals which may be utilized for checking received data. Specifically, the results of a bit-by-bit comparison of the two received data signals are available, parity checks for each of the two received signals appear at the output of circuits 52 and 54, and digital check signals indicating noise hits on the two lines are also developed. The logic circuit 58 correlates the three types of error checking information mentioned above, and controls the switching circuit 60 shown in Fig. 1 to connect one of the two transmission channels to the utilization circuit 22, or to interrupt signal transmission entirely.

The mode of operation of the logic circuit 58 may be as indicated in the following table.

*Table I*

| Condition | Bit-by-Bit Comparator | Parity Check-A | Parity Check-B | Noise Circuit A | Noise Circuit B | Switching Action |
|---|---|---|---|---|---|---|
| 1 | OK | OK or E | OK or E | OK or E | OK or E | NS |
| 2 | E | E | OK | OK or E | OK | B |
| 3 | E | E | OK | OK or E | E | I |
| 4 | E | E | E | OK or E | OK or E | I |
| 5 | E | OK | E | OK | OK or E | A |
| 6 | E | OK | E | E | OK or E | I |
| 7 | E | OK | OK | OK | OK | I |
| 8 | E | OK | OK | E | E | I |
| 9 | E | OK | OK | OK | E | A |
| 10 | E | OK | OK | E | OK | B |

order to operate properly. It is therefore desirable to delete words when there is considerable likelihood that the received words are erroneous.

Condition 5 is similar to condition 2 in that parity has failed for one of the lines but not for the other, and the line indicated as having a correct received code group by the parity check also has not been hit by noise. In the case of condition 5, line A appears to bear the correct message. Accordingly, this line is selected.

Condition 6 corresponds to condition 3. In condition 6 as in condition 3, the circuit having a valid parity check has also been hit by noise. In the case of condition 6, this line is line A. Because of the conflicting check signals, no word signal is transmitted to the utilization circuit 22.

Conditions 7 and 8 show an error in the bit-by-bit comparison while the parity checks for both channels are satisfied. In addition, condition 7 shows that the noise circuits have not been energized, whereas condition 8 indicates that both noise circuits have been energized. Under these circumstances, there is insufficient data to indicate which channels should be selected, so the circuit is interrupted for one word period.

In the foregoing table, E indicates an error, OK indicates no error, the letters A and B denote circuits A and B, the letter I indicates circuit interruption, and NS denotes "no selection." The "no selection" condition actually means "no change in selection," and the switch remains in the previous channel selection position.

In Table I, ten input signal conditions from the five check circuits are tabulated. These various possible input signal conditions will now be considered in order. First, if the bit-by-bit comparison gives a binary signal (designated "OK" in Table I), indicating that the received words from channels A and B are identical, logic circuit 58 does not change the selection state of the switching circuit 60. Thus, for example, if channel A has been connected to the utilization circuit, it will remain connected to the utilization circuit.

Condition 2 in Table I represents a combination of check signals in which the bit-by-bit comparator indicates an error, and the parity check of the word received on channel A shows an error and the parity check for channel B indicates a correctly received word. The noise circuit associated with channel A could either show a check or no check, and the noise circuit associated with Channel B shows no received noise hits. In view of the fact that both the parity check and the noise detection circuit indicate no trouble on channel B, signals from this channel are connected to the utilization circuit 22.

Conditions 3 and 4 are such that it is considered inadvisable to select either channel. In both conditions 3 and condition 4, the bit-by-bit comparator circuit indicates an error, and the parity check for channel A also indicates an error. In condition 3 of Table I, the parity check for channel B indicates a valid received code group but the noise circuit associated with channel B shows that this channel has been hit by noise. Under these circumstances, it is considered that neither signal is likely to be correct, and signal transmission is interrupted. In condition 4, where both parity checks fail, interruption is again considered desirable. As shown in Fig. 1, the alarm circuit 66 may be energized when signal transmission is interrupted. In passing, it may be noted that the utilization circuit 22 requires a moderately high degree of continuity in correctly received information in The conditions indicated at 9 and 10 are similar to those shown at 7 and 8 in Table I in that the bit-by-bit comparator indicates an error, and both parity checks are satisfied. However, one of the noise circuits has been energized, whereas the other noise circuit has not been energized. Under these circumstances, the channel which has not been affected by noise is selected.

The logic operations indicated by Table I are implemented by the circuit of Figs. 4 and 5. The inputs to the circuit of Figs. 4 and 5 are the five error checking signals and the start pulse signal from the digital data receiver. The error checking signals are applied to the five upper leads shown to the left of Figs. 4 and 5. Specifically, the output from the bit-by-bit comparator is applied on lead 104 to control the state of the bistable flip-flop 105. The parity check signals for lines A and B are applied on leads 106 and 108 to control the states of flip-flops 110 and 112, respectively. The signals from the noise detection circuits associated with lines A and B are applied on leads 114 and 116 to control the states of flip-flops 118 and 120, respectively. Start signals from the digital data receiver associated with the line having the maximum delay are applied on lead 122 to the pulse shaper circuit 124. Output signals from the circuit 124 are applied to both the monostable flip-flop delay circuit 126 and the cathode follower 128. The circuit 126 provides reset signals to set the bistable circuits 105, 110, 112, 118, and 120 to their normal states.

The output signals from the bistable flip-flops in which the error checking signals are registered are amplified by the cathode followers 131 through 140. In each case the relative polarity of the signals at the outputs of the cathode followers when the bistable multivibrators are in their normal or reset conditions is indicated in the cathode follower blocks in Figs. 4 and 5. The cathode followers all have positive output signals, but the outputs which are more positive are marked with a plus sign, and those which are less positive are marked with a minus sign, for the conditions mentioned above.

In the circuit of Figs. 4 and 5, an And gate is provided for each of the conditions 1 through 10. These And circuits each include two or more diodes, and are designated by the reference numerals 141 through 150 in the circuit of Figs. 4 and 5. Each group of diodes includes one diode which is coupled to the cathode follower 128 at the output of the pulse shaper circuit 124. The cathode follower supplies a read-out pulse to lead 152, which is connected to the lowermost diode in each of the And gates 141 through 150.

The mode of operation of the And gates 141 through 150 is conventional. More specifically, the voltage at the output of each And gate will be the voltage of the highest positive cathode follower. Therefore, if all of the cathode followers connected to a gate are in the "negative," or less positive condition, the voltage at the output of the And gate will be this "negative" voltage.

The operation of the logic circuit of Figs. 4 and 5 under certain representative conditions set forth in Table I will now be considered. Considering condition 1, the bit-by-bit comparator error signal does not occur. Accordingly, the cathode follower 132 has a negative output signal. This provides one input to the And circuit 141. The other input is supplied by the negative read-out pulse on lead 152. The resultant output pulse from And circuit 141 is transmitted through isolating diode 154 to the upper input lead 156 of the bistable flip-flop 158. The circuit 158 controls the operation of the circuit interruption relay 160. When the bistable flip-flop 158 is energized by a pulse on lead 156, the output of the cathode follower 162 is negative, and the output of the cathode follower 166 is positive. With a negative signal on lead 164 at the output of cathode follower 162 and a positive signal on lead 168 at the output of cathode follower 166, the diode 170 is forward-biased, and current is supplied to the coil 160 of the circuit interruption relay. When the lower lead 157 at the input of the flip-flop 158 is energized, the polarity on leads 164 and 168 is reversed, the diode 170 is back-biased, and the circuit interruption relay 160 is not operated.

As mentioned above, the output signal from the And circuit 141, corresponding to condition 1 of Table I, energizes the upper input lead 156 of flip-flop 158. Under these conditions, the circuit interruption relay 160 is energized, thereby closing the "data" contacts of the relay.

It may also be noted that the lead 172 at the output of cathode follower 131 is connected as an input to all of the remaining And gates 142 through 150 corresponding to conditions 2 through 10 of Table I. With this lead in the positive state, none of the And circuits 142 through 150 is energized. Accordingly, the state of the bistable flip-flop 174 cannot be changed. In view of the fact that the bistable flip-flop 174 controls the selection of signals from channel A or channel B, no change in this selection is effected. Accordingly, the indicated lack of selection under condition 1 of Table I is verified.

As another illustrative example, the implementation of condition 5 of Table I will now be considered by reference to Figs. 4 and 5. Referring to Table I, it may be noted that condition 5 requires (1) that the bit-by-bit comparator indicate an error, (2) that the parity check for channel A indicate a correct parity check, (3) that the parity check circuit for channel B indicate an error, and (4) that the noise circuit associated with channel A indicate that no noise hits occur during the word period in question. For the purposes of condition 5, the state of the noise detection circuit associated with channel B is immaterial. With the parity and the noise circuit both indicating that the signals received on channel A are correct, the preferred circuit selection indicated by condition 5 of Table I is that channel A should be selected.

The inputs to the And circuit 145 corresponding to condition 5 will now be examined. The uppermost input lead 176 is energized by a negative output signal from the cathode follower 131 associated with the bit-by-bit comparator flip-flop 105. The second input lead 178 to the And circuit 145 is connected to the cathode follower 134 at the output of the A parity check flip-flop 110. With no signal being applied to lead 106, the flip-flop 110 remains in the state in which the output from cathode follower 134 is negative. The second of the five required negative input signals to And gate 145 is therefore provided. The cathode follower 135 is coupled to the third input 180 of the And circuit 145. An error signal is applied to lead 108 to set bistable flip-flop 112 to the state in which the output from the cathode follower 135 is negative. The fourth input lead 182 to And circuit 145 is connected to the cathode follower 138 at the output of the noise detector flip-flop 118 associated with channel A. With no signal received on lead 114, the output signal from cathode follower 138 is negative. The fifth and final input signal to And circuit 145 is provided by the read-out pulse applied to lead 152. The output signal from the And circuit 145 is applied to the upper input lead 184 of the bistable flip-flop 174. The bistable flip-flop 174 controls the channel selection circuits. When a pulse is applied to lead 184 at the input to the bistable flip-flop 174, the cathode follower 186 has a negative output and the cathode follower 188 produces a positive output signal. Diode 190 and relay coil 192 are connected in series between the outputs of the two cathode followers 186 and 188. When input lead 184 is energized, the flip-flop 174 is set to the state in which diode 190 is conducting and relay 192 is energized. Under these circumstances, channel A is selected. When the flip-flop 174 is operated to its other state, however, the diode 190 is back-biased, relay coil 192 is not energized, and channel B is selected.

In the preceding paragraphs, the input leads to the And circuit 145 have been traced. In addition, it has been shown that when the error check circumstances shown at condition 5 in Table I obtain, an output pulse from And circuit 145 is produced. This output signal enables the channel selection flip-flop 174 to select channel A. It is clear, therefore, that the circuit of Fig. 5 is operative to fulfill the selection result indicated by condition 5 of Table I.

In the preceding description, it has been shown that the And circuits 141 and 145 control the interruption relay 160 and the circuit selection relay 192 to perform the functions indicated under conditions 1 and 5 as set forth in Table I. In a similar manner, the And circuits 142 through 143 and 146 through 150 are operative to control the circuit selection and circuit interruption switching operations indicated by the corresponding entries in Table I. The exact details of the operation of each of the remaining And gates will therefore not be considered. From an over-all standpoint, however, it is evident that the logic circuit shown in Figs. 4 and 5 operates properly to apply successive words of digital information from channel A or channel B to the utilization circuit in accordance with Table I.

Figure 6:
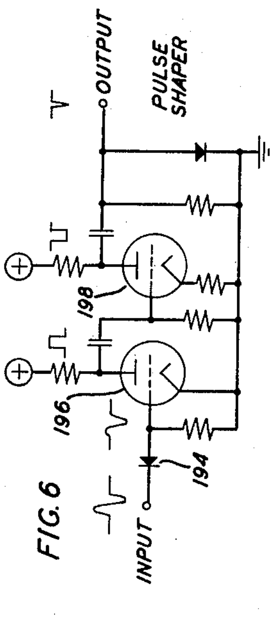

The circuits of Figs. 6 through 9 represent simplified building blocks or components which may be employed in the logic circuit of Figs. 4 and 5. Fig. 6 is a circuit which may be used as the pulse shaper 124 of Fig. 5. The circuit transforms the dipulse input into a sharp negative-going pulse which is employed as the read-out pulse for the And circuits of Figs. 4 and 5. In Fig. 6, the diode 194 clips the positive half cycle of the input dipulse. The triode 196 produces a positive output pulse, and this positive output pulse is inverted and squared up by the triode 198. An output differentiation circuit produces the desired negative-going output signal.

Figure 7:
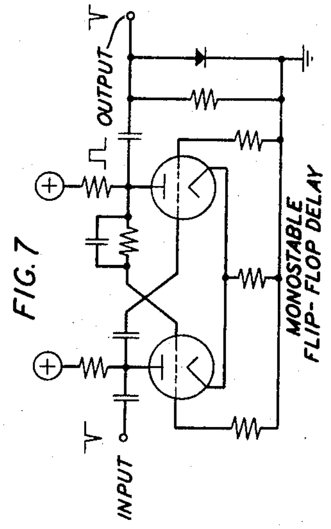

Fig. 7 shows a simple conventional monostable flip-flop which also includes some delay. The desired characteristics are provided by the alternating current circuit which couples the grid of one tube to the plate of the other, and the direct current coupling of the grid of the second tube to the plate of the first. A differentiating circuit is again provided to produce the negative-going output pulse.

Figure 8:
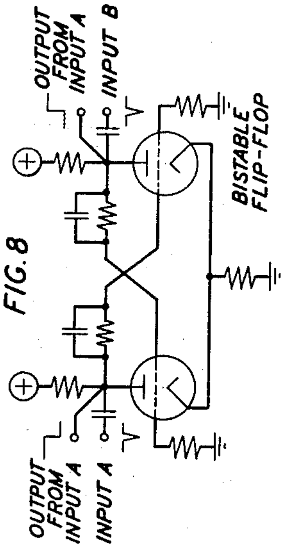

Fig. 8 shows a conventional bistable flip-flop or multivibrator employing triodes. The grid-to-plate cross couplings are direct current couplings, so that the circuit is stable with either tube conducting.

Figure 9:
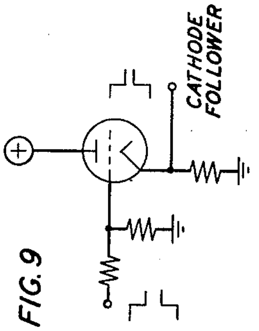

Fig. 9 is a conventional cathode follower circuit. Input signals are applied to the grid of the triode, and output signals are produced across the cathode resistor.

As mentioned above, Table I and the circuit of Figs. 4 and 5 indicate one mode of operation and circuit implementation of the logic circuit 58 and switching circuit 60 of Figs. 4 and 5. For the purposes of Table I and Figs. 4 and 5, the presence of a bit-by-bit check of the signals from channels A and B was considered sufficient to warrant "no selection" in the switching circuitry 60 of Fig. 1.

A more sophisticated mode of operation of the logic circuit 58 is set forth in Table II. The circuit for the implementation of Table II is designated Figs. 10 and 11, as it appears on two sheets of the drawing. Table II is set forth below.

ditions, channel A is selected in preference to channel B. Condition 12 is similar to condition 11 with the exception that the parity check for channel B rather than channel A is correct. Channel B is therefore selected.

In conditions 13 and 14, selection is made on the basis of check signals at the output of both the parity and noise circuits for either channel A or B. In the case of condition 13, channel B is selected in view of the "OK" signals from the bit-by-bit comparator, and the channel B parity and noise circuits. Similarly, referring to condition 14, the check signals from the channel A parity and noise circuits lead to the selection of channel A.

In the case of condition 15, the bit-by-bit comparator and the two parity check circuits indicate no error, while the noise circuits indicate the occurrence of noise hits during the time period in which the signals were received. Under these circumstances, it is probable that both received code groups are correct, and it is impossible to give preference to either signal. Accordingly, no change of selection is made.

The circuit of Figs. 10 and 11 may be employed to implement Table II. In the circuit of Figs. 10 and 11, many circuit components are identical with those shown in Figs. 4 and 5 and therefore are identified by the same reference numerals. Because the logic circuitry is somewhat different, however, the And circuits corresponding to conditions 1 through 15 of Table II have been given new reference numerals 201 through 215. It may be

*Table II*

| Condition | Bit-by-Bit Comparator | Parity Check-A | Parity Check-B | Noise Circuit A | Noise Circuit B | Switching Action |
|---|---|---|---|---|---|---|
| 1 | OK | OK | OK | OK | OK | NS |
| 2 | E | E | OK | OK or E | OK | B |
| 3 | OK or E | E | OK | OK or E | E | I |
| 4 | OK or E | E | E | OK or E | OK or E | I |
| 5 | E | OK | E | OK | OK or E | A |
| 6 | OK or E | OK | E | E | OK or E | I |
| 7 | E | OK | OK | OK | OK | I |
| 8 | E | OK | OK | E | E | I |
| 9 | E | OK | OK | OK | E | A |
| 10 | E | OK | OK | E | OK | B |
| 11 | OK | OK | E | OK | OK | A |
| 12 | OK | E | OK | OK | OK | B |
| 13 | OK | OK or E | OK | E | OK | B |
| 14 | OK | OK | OK or E | OK | E | A |
| 15 | OK | OK | OK | E | E | NS |

The meaning of the symbols employed in Table II has been set forth above in connection with Table I.

The conditions 1 through 15 of Table II may best be considered by comparison with the conditions of Table I. In the conditions defined in Table I, it may be recalled that no change in selection was required when the bit-by-bit comparator indicated no error. This was condition 1 of Table I. In Table II, some selection action takes place with certain noise and parity check conditions, even when the bit-by-bit comparator indicates a check. Thus, the first condition in Table II indicates no change in selection only when all five of the check circuits have "OK" output signals.

Conditions 2 through 10 of Table II correspond closely to conditions 2 through 10 of Table I. The only differences appear under conditions 3, 4, and 6 of Table II. Under the column indicating the output of the bit-by-bit comparator, the indication "OK or E" appears in Table II following conidtions 3, 4, and 6, whereas only the designation "E" appeared at these points in Table I. From a physical standpoint, conditions 3, 4, and 6 represent situations in which there is sufficient contradiction in the results indicated by the parity check and noise circuits to warrant interruption whether or not the bit-by-bit comparator indicates a check.

In condition 11, the bit-by-bit comparator indicates a check, the parity circuit for line A shows a check, the parity circuit for line B indicates an error, and both of the noise circuits indicate a check. Under these connoted that the And circuit 201 corresponding to condition 1 of Table II has several more inputs than the corresponding And circuit 141 of Figs. 4 and 5. This is a result of the requirement that all five check signals indicated "OK" in order to produce the desired lack of selection under these input conditions.

It may be noted that the over-all mode of operation of the circuit of Figs. 10 and 11 is identical with that of Figs. 4 and 5. For example, the read-out pulses from the cathode follower 128 are applied to the lowermost diodes of each of the And gates 201 through 215. The relay circuits are operated by connections from the And gates to implement the switching operations shown in Table II in exactly the same manner that the corresponding circuits of Figs. 4 and 5 were operated to implement Table I. Accordingly, no further detailed description of Figs. 10 and 11 is required.

Fig. 12 shows a frequency division multiplexing arrangement to which the principles of the invention are applicable. In Fig. 12, start, data, and timing pulses are routed to the digital data transmitters 218 and 220 by the bridge circuit 222. Signals from the digital data transmitter 218 are passed through the low pass filter 224 and the mixing circuit 226 to the transmission line 228. The low pass filter 224 eliminates high frequency components which might be present in harmonic form in the signal from the transmitter 218. Signals from the digital data transmitter 220 are passed through the delay circuit 230 to the modulator 232. The modulator 232 combines modulated signals from the delay circuit 230 with signals developed by the carrier oscillator 234. The modulated signals originated by the data transmitter 220 are thus shifted in frequency at the output of the modulator 232. The band-pass filter 236 interconnecting the modulator 232 and the mixing circuit 226 blocks the transmission of signals outside the desired new signal frequency band. In the mixing circuit 226, the two sets of modulated signals are combined and applied to the transmission line 228 in different frequency bands.

At the receiving terminal, the modulated signals are coupled by the bridge circuit 238 to the low pass filter 240 and the band-pass filter 242. The carrier oscillator 244 and the demodulator 246 shift the signals on channel B down to the normal signal modulation range. The resultant signals from the demodulator 246 are passed through the low pass filter 248. The signals at the output of the filter circuits 240 and 248 are applied to the data receivers and error reduction circuits designated 250. This circuitry corresponds to the entire receiver terminal circuitry shown at the right-hand side of Fig. 1.

The delay circuit 230 in the transmitting terminal of Fig. 12 introduces a delay which is greater than one digit period into the signals transmitted on channel B. Compensation for this delay is introduced in the circuit 250 at the receiver terminal. With the resulting difference in delay, any errors caused by noise hits or switching, for example, occur during different digit periods in the data words transmitted over the two channels, and hence will be detected by the checking circuits. The noise detection circuits included in circuit 250 may be coupled to a point before the filters 240 and 242, and their output signals are delayed properly for association with the proper input signals.

Two circuit arrangements for applying the principles of time division multiplexing to the present data transmission system are shown in Figs. 13 and 14. Each of the circuit arrangements requires that the data bit rate on the transmission line be twice the data bit rate normally employed between the digital data transmitters and receivers.

In the transmitting terminal of the time division multiplexing arrangement of Fig. 13, the input data signal pulses are fed to a pulse width dividing circuit 252 where each of the "mark" signals is regenerated with a time period or width of one half of that of the normal input "mark" signals. The output of the pulse width divider 252 is coupled by the bridge circuit 254 to the mixing circuit 256 and the delay circuit 258. The delay circuit 258 has a delay of one digit period plus an even number of digit periods, where a digit period is measured at the output of the pulse divider 252. The one-digit period of delay is for the purposes discussed above in connection with the circuit of Fig. 12, the additional even number of bits being provided for interleaving the signals on channel B with those on channel A. The resulting interleaved signals are applied from the mixing circuit 256 to the digital data transmitter 260. Modulated output signals from the digital data transmitter 260 are transmitted along the line 262 to the bridge circuit 264. Channel A at the receiving terminal includes the delay circuit 266 having a delay equal to that of the circuit 258 at the transmitting terminal. The receiving terminal also includes the digital data receivers 268 and 270, and their associated noise detection circuits 272 and 274. Timing signals for the digital data receivers 268 and 270 and for the noise circuits 272 and 274 are provided by the timing control circuit 276. The timing circuit 276 enables the noise circuits 272 and 274 during alternate time intervals so that they are only enabled during the time of reception of signals associated with channels A and B, respectively. Similarly, the digital data receivers 268 and 270 are enabled to detect alternate received bits from the transmission line 262. The remaining circuitry to the right of that shown in the receiving terminal of Fig. 13 is the same as that shown in Fig. 1, for example.

The system of Fig. 14 is very similar to that of Fig. 13. The principal difference lies in the transmission of successive words which are associated with channels A and B, rather than the transmission of interleaved bits associated respectively with the two channels. In Fig. 14 the start, data, and timing signals are applied to the storage circuit 278. The start signals are applied to control the read-out circuit 280. Under the control of the read-out circuit 280, data signals in the storage circuit 278 are read out to the digital data transmitter 282. The speed of read-out from the storage circuit 278 is twice as fast as the speed at which signals are applied to the storage circuit. In addition, each word stored in the storage circuit 278 is read out twice during the period in which the next subsequent word is applied to the storage circuit.

Following transmission over the line 284, the received signals are coupled by the bridge circuit 286 to the two receiver channels 288 and 290. Channel 288 is coupled to the noise circuit 292 and the digital data receiver 294. The signals on channel 290 are delayed by one word period in the circuit 296, and are then applied to the noise circuit 298 and the digital data receiver 300. The timing circuit 302 enables the noise circuits 292 and 298 during the proper intervals to detect noise associated with information detected by the digital data receivers 294 and 300. The signals from the digital data receivers 294 and 300 are applied at a high pulse repetition rate during alternate word periods to the storage circuits 304 and 306. Under the control of the read-out circuit 308, word signals are read out from storage circuits 304 and 306 synchronously and at the desired slower pulse repetition rate. The receiving terminal in the circuit of Fig. 12 would also include the parity check and bit-by-bit comparator as well as other circuits which are shown at the right-hand side of Fig. 1. In addition, the selection of channels A or B of Fig. 14 is accomplished in one of the manners discussed above for the circuit of Fig. 1.

In the foregoing detailed description, the present invention has been described in the context of systems in which each bit of digital information is transmitted twice. In an important sense, the present invention is also applicable to systems in which digital information is transmitted with a lesser degree of redundancy. For specific example, the situation will be considered in which the transmission of a series of code groups is followed by a parity check summary code group. Table III, which is set forth below, indicates a typical set of code groups of this type.

*Table III*

| | | | | | | | |
|---|---|---|---|---|---|---|---|
| 1st Code Group | 0 | 1 | 1 | 0 | 1 | 0 | Information Code Groups. |
| 2nd Code Group | 1 | 1 | 0 | 1 | 1 | 0 | |
| 3rd Code Group | 1 | 0 | 1 | 1 | 0 | 1 | |
| 4th Code Group | 0 | 0 | 1 | 1 | 1 | 0 | |
| 5th Code Group | 1 | 1 | 0 | 0 | 1 | 1 | |
| 6th Code Group | 1 | 1 | 1 | 1 | 0 | 0 | Summary Parity Check. |

Thus, for example, with reference to Table III, five code groups of six bits each are transmitted, and the sixth code group is a summary parity check code group. The sixth code group is made up of digits which individually check the parity of successive digits of each of the preceding code groups. Thus, for example, referring to Table III, the first digit of the summary code group is a "1." Using an even parity check system, the first digit of the summary check group must be a "1" to make the total number of "1's" in the first column of Table III add up to an even number. The remaining digits of the sixth code group shown in Table III are formed in the same manner as described above for the first digit. As signals of the type shown in Table III are received and decoded, noise detection circuitry is also utilized. The noise detection circuitry is similar to that described above;

specifically, noise signals are detected and registered in accordance with the received signals with which they are associated. In the present system, for example, the successive code groups may be employed to actuate a tape perforator, or may actually be used to produce typewritten characters at the receiver. Detected noise hits outside the normal signal transmission band are detected and employed to mark the received record to indicate the code group which was being received at the time the noise hit occurred. Subsequently, if the summary parity check indicates an error, the erroneous received information may readily be located through the identification mentioned above. Correction of the erroneous received digit is then possible by the identification of the code group in which the noise hit occurred, and the identification of the particular erroneous received bits through the summary parity check.

The circuits described above have been discussed in the context of a receiver including five separate check circuits. These check circuits include the bit-by-bit comparator and the noise and parity check circuits for each of the two channels. It is to be understood that the circuits are also applicable to situations in which a lesser number of output check signals are available. Thus, for example, a system could be arranged in which the noise responsive check circuits are adjusted to a relatively high level so that they are energized only by relatively severe noise hits. Under these circumstances, the likelihood of impairment of data is high, and the transmission of digital data to the utilization circuit would be interrupted. In a similar manner, bit-by-bit comparison information could be used with either parity check information or with noise check signals. Selection of one channel or interruption of the digital signals could then be made in much the same manner as is indicated in Table I. It is to be understood, however, that in a preferred embodiment of the invention, all five check signals mutually cooperate to produce a far higher level of error elimination than is possible with any subcombinations of the over-all circuit.

It is to be understood that the above-described arrangements are illustrative of the application of the principles of the invention. Numerous other arrangements may be devised by those skilled in the art without departing from the spirit and scope of the invention.

What is claimed is:

1. In a digital data handling system, a source of digital signals, said source including means for providing information digits and parity check digits for said information digits, two transmission channels, a transmitter for applying signals representing said information and parity digits to both of said two transmission channels, receiving apparatus coupled to said two transmission channels, a bit-by-bit comparison check circuit included in said receiving apparatus for checking the identity of received signals on said two channels, an individual parity check circuit associated with each channel in said receiving apparatus, a level responsive noise detection check circuit associated with each channel in said receiving apparatus, a digital information utilization circuit, switching circuits responsive to digital signals developed by said check circuits for coupling digital information from the one of said two channels which is most probably correct to said utilization circuit during successive time intervals, an alarm circuit, and additional switching circuits responsive to the digital signals developed by said check circuits for interrupting signal transmission to said utilization circuit and for energizing said alarm circuit when the digital information on both of said channels is probably erroneous.

2. In a digital data handling system, a source of digital signals, said source including means for providing information and check digits, a data link, transmitting means coupled to said source for applying said digital signals to said data link, decoding means coupled to said data link for obtaining error checking signals from the received signals, a level actuated noise detection circuit for producing additional error checking signals in digital form in response to noise hits on said data link, and logic circuit means coupled to said decoding means and said noise detection circuit for identifying and eliminating errors in the received digital signals.

3. In a digital data handling system, a source of digital signals, said source including means for providing information digits and parity check digits for said information digits, two transmission channels, a transmitter for applying signals representing said information and parity digits to both of said two transmission channels, a receiving apparatus coupled to said two transmission channels, a bit-by-bit comparison check circuit included in said receiving apparatus for checking the identity of received signals on said two channels, an individual parity check circuit associated with each channel in said receiving apparatus, a level responsive noise detection check circuit associated with each channel in said receiving apparatus, a digital information utilization circuit, switching circuits for selectively connecting said two channels to said utilization circuit, and logic circuitry responsive to the digital signals developed by said five check circuits for energizing said switching circuits for eliminating erroneous received digital signals.

4. A system as defined in claim 3 wherein geographically separated transmission facilities are provided for said two transmission channels.

5. A system as defined in claim 3 wherein means are provided for shifting the frequency band of one of said transmission channels with respect to the other channel.

6. A system as defined in claim 3 wherein means are provided for delaying digital signals applied to one of said channels with respect to the digital signals applied to the other channel.

7. In a digital data handling system, a source of digital signals, said source including means for providing information and check digits, a data link, transmitting means coupled to said source for applying said digital signals to said data link, decoding means coupled to said data link for obtaining error checking signals from the received signals, a level actuated spurious signal detection circuit for producing additional error checking signals in digital form in response to spurious signals on said data link, and logic circuit means coupled to said decoding means and said detection circuit for eliminating erroneous received digital signals.

8. In a digital data handling system, a digital data transmitter, a digital data receiver, a transmission channel intercoupling said transmitter and said receiver, an electrical delay component, a utilization circuit coupled to said receiver by a circuit including said electrical delay component, a level actuated noise responsive bistable circuit associated with said receiver for indicating the occurrence of severe noise hits on said channel, and switching circuit means responsive to output signals from said noise circuit for interrupting the circuit coupling said receiver to said utilization circuit to eliminate the digital signals subject to said noise hits.

9. In a digital data handling system, a digital data transmitter, a digital data receiver, a transmission channel intercoupling said transmitter and said receiver, a utilization circuit coupled to said receiver, a level actuated noise responsive bistable circuit associated with said receiver for indicating the occurrence of severe noise hits on said channel, and switching circuit means responsive to output signals from said noise circuit for interrupting the coupling between said receiver and said utilization circuit to eliminate digital signals subject to said noise hits.

10. In a digital data handling system, a source of digital signals, said source including means for providing information digits and parity check digits for said information digits, two transmission channels each having preassigned frequency transmission bands, a transmitter for applying signals representing said information and parity digits to both of said two transmission channels, a receiving apparatus coupled to said two transmission channels, a bit-by-bit comparison check circuit included in said receiving apparatus for checking the identity of received signals on said two channels, an individual parity check circuit associated with each channel in said receiving apparatus, a level sensitive noise detection check circuit coupled to each channel in said receiving apparatus, filter circuit means included between said channels and said noise detection circuits for blocking digital signals in said preassigned frequency bands, a digital information utilization circuit, switching circuits responsive to digital signals developed by said check circuits for coupling digital information from the one of said two channels which is most probably correct to said utilization circuit during successive time intervals, an alarm circuit, and additional switching circuits responsive to the digital signals developed by said check circuits for interrupting signal transmission to said utilization circuit and for energizing said alarm circuit when the digital information on both of said channels is probably erroneous.

11. In a digital data handling system, a source of digital signals, said source including means for providing information and check digits, a data link, transmitting means coupled to said source for applying said digital signals to said data link, decoding means coupled to said data link for obtaining error checking signals from the received signals, level actuated noise detection circuit means responsive to noise hits on said data link outside the signal transmission band for producing additional error checking signals in digital form, and logic circuit means coupled to said decoding means and said noise detection means for identifying errors in the received digital signals.

12. In a digital data handling system, means for providing redundant digital signals, a data link, a receiver, means for transmitting said redundant digital signals to said receiver over said data link, decoding means included in said receiver for obtaining error checking signals from the redundant received signals, a level actuated noise detection circuit for producing additional error checking signals in digital form in response to noise hits on said data link, and logic circuit means for detecting errors in the received digital signals in accordance with the error checking signals from said decoding means and said noise detection circuit.

13. In a digital data handling system, a source of digital signals, two transmission channels, a transmitter for applying signals representative of said digital signals to both of said two transmission channels, a receiver coupled to said two transmission channels, a bit-by-bit comparison check circuit at said receiver for checking the identity of received signals on said two channels, a level responsive noise detection check circuit associated with each channel at said receiver, a digital information utilization circuit, switching circuits for selectively connecting said two channels to said utilization circuit, and logic circuitry responsive to the digital signals developed by said check circuits for energizing said switching circuits to eliminate erroneous received digital signals.

No references cited.